C. A. WARD.
Cotton-Bale Ties.
No. 157,303.　　　　　　　　　　　　　Patented Dec. 1, 1874.
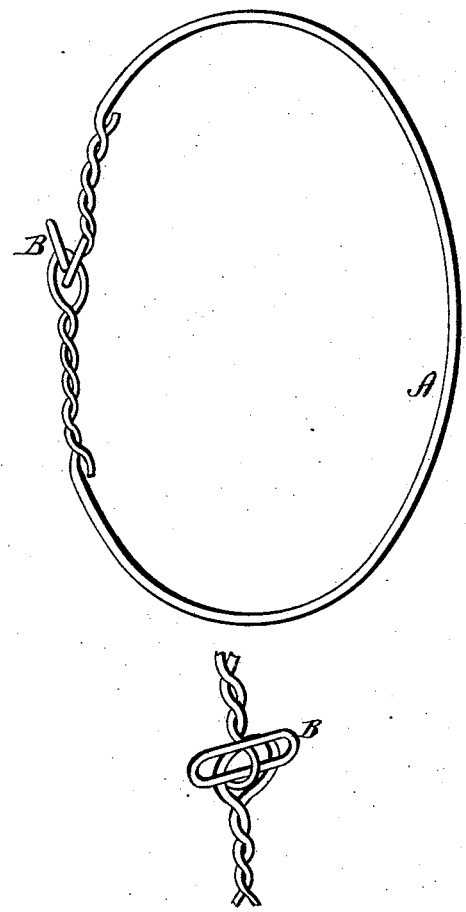
WITNESSES.　　　　　　　　　　　　　　　INVENTOR
Franck L. Durand　　　　　　　　　　　　Chas. A. Ward.
C. L. Evert　　　　　　　　　　　　　　By Alexander Mason
　　　　　　　　　　　　　　　　　　　　　Attorneys.

UNITED STATES PATENT OFFICE.

CHARLES A. WARD, OF OWEGO, NEW YORK.

IMPROVEMENT IN COTTON-BALE TIES.

Specification forming part of Letters Patent No. 157,303, dated December 1, 1874; application filed May 9, 1874.

*To all whom it may concern:*

Be it known that I, CHAS. A. WARD, of Owego, in the county of Tioga and in the State of New York, have invented certain new and useful Improvements in Bale-Tie; and do hereby declare that the following is a full, clear, and exact description thereof, reference being had to the accompanying drawings, and to the letters of reference marked thereon, making a part of this specification.

The nature of my invention consists in connecting the two ends of a wire band, with loops in each end, by means of a link, as will be set forth.

In the annexed drawings, which represent a plan and edge view of my bale-tie, A represents a piece of wire of the size ordinarily used for baling hay, at each end of which a loop is formed. This loop is made by bending the wire around near its end and twining the end that is left around the other portion, as is represented in the figures. Before bending one of the ends, a metallic link, B, is slipped over it in such manner as to be caught and held in the loop formed by it. When this wire band is placed around a bale of hay or other material, the two ends are brought together, and the link on one end is inserted in the loop of the other end, and then drawn crosswise of the two loops, as seen in the edge view of the figures. This holds the two ends securely together. The bale may be easily released by simply slipping the link, so that it will pass out of the loop of the opposite end to which it is fastened.

Having thus fully described my invention, what I claim as new, and desire to secure by Letters Patent, is—

A bale-tie consisting of the wire A, twisted at each end into a loop, the smaller of said loops holding the long link B, substantially as and for the purposes set forth.

In testimony that I claim the foregoing I have hereunto set my hand this 22d day of April, 1874.

CHARLES A. WARD.

Witnesses:
 LYMAN SETTEL,
 H. I. KING.